United States Patent [19]

Hotta et al.

[11] 3,897,565
[45] July 29, 1975

[54] METHOD OF FEEDING SILKWORMS AN ARTIFICIAL EXPANDED FEED

[76] Inventors: Saburo Hotta, 9 Kimiwasa-cho, 33-chome, Totsuka-ku, Yokohama-shi, Kanagawa-ken; Kiyozi Wada, 877 Kumisawa-cho, Totsuka-ku, Yokohama-shi, Kanagawa-ken; Yosiaki Kikuchi, 1130 Futoo-cho, Kohoku-ku, Yokohama-shi, Kanagawa-ken, all, Japan

[22] Filed: Mar. 19, 1973

[21] Appl. No.: 342,552

Related U.S. Application Data

[63] Continuation-in-part of Ser. No. 57,830, July 23, 1970, abandoned.

[30] Foreign Application Priority Data

July 25, 1969 Japan.............................. 44-58369
Mar. 10, 1970 Japan.............................. 45-19726

[52] U.S. Cl. .................. 426/2; 426/141; 426/210; 426/242; 426/346; 426/374; 426/446; 426/448; 426/458
[51] Int. Cl.² ... A23K 1/14; A23K 1/16; A23K 1/18
[58] Field of Search ............ 426/2, 62, 72, 73, 346, 426/210, 212, 213, 215, 445, 446, 448, 449, 450, 458, 242, 243, 141, 374

[56] References Cited
UNITED STATES PATENTS

| | | |
|---|---|---|
| 2,879,163 | 3/1959 | Anson et al............................ 99/14 |
| 3,488,196 | 1/1970 | Niimura et al........................... 99/2 |
| 3,544,332 | 12/1970 | Leebens................................. 99/83 |
| 3,583,871 | 6/1971 | Niimura et al........................... 99/2 |
| 3,615,677 | 10/1971 | Scharschmidt et al. ............. 426/72 |

OTHER PUBLICATIONS

T. Fukuda, The Nutrition and Metabolism of Silkworms, 99-2, pp. 1-14 of Translation, Nov. 1962.

*Primary Examiner*—Jack Sofer
*Assistant Examiner*—Curtis P. Ribando
*Attorney, Agent, or Firm*—Sughrue, Rothwell, Mion, Zinn & Macpeak

[57] ABSTRACT

There is provided a method for feeding silkworms which comprises administering to silkworms, a dry porous artificial silkworm feed which comprises:

a blend consisting essentially of dry ingredients, containing nutritional values advantageous to the growth and health of silkworms, said feed having been prepared by a stepwise procedure as follows:

a. blending dry ingredients consisting essentially of nutritional values advantageous to the growth and health of silkworms, b. subjecting the blend obtained to steam heating in order to form a mixture of said blended dry ingredient, c. coagulating said mixture to form an expanded, porous mixture, and d. drying the resulting porous mixture.

18 Claims, No Drawings

METHOD OF FEEDING SILKWORMS AN ARTIFICIAL EXPANDED FEED

CROSS-REFERENCE TO RELATED APPLICATIONS

This application is a continuation-in-part application of our earlier co-pending application, Ser. No. 57,830, filed July 23, 1970, now abandoned, which claims priority from July 25, 1969 and Mar. 10, 1970, based on Japanese patent applications Ser. Nos. 58369/69 and 19726/70, respectively.

BACKGROUND OF THE INVENTION

1. Field of the Invention:

This invention relates to artificial silkworm feeds.

2. Description of the Prior Art:

Heretofore various types of artificial silkworm feeds have been developed and proposed. However, most of them have been coagulated with agar-agar so that their moisture sorption property would be 50 to 85 percent. Namely, these artificial feeds have been prepared by adding the pulverized ingredients into an aqueous solution of agar-agar, the mixture being steamed for more than 15 minutes and then cooled and solidified so as to coagulate. An artificial feed thus prepared is apt to be perishable and its storage stability is poor. Accordingly, it is necessary to freshly prepare such a feed for each silkworm feeding, or to store the feed in a refrigerator after it is manufactured. Even if kept in the refrigerator, the freshness and quality of the feed declines considerably after about 5 days from the time of manufacture. Naturally, the growth of silkworms fed with such feeds would not be satisfactory.

Further, the aforementioned artificial feed for silkworms, prepared with agar-agar as a coagulant, is very inconvenient in delivery as its moisture sorption property is 50 to 85 percent, as explained before, With such artificial feeds, an extra cost must be borne to equip special storing facilities. Furthermore, they are rather troublesome because, in use, they must be sliced or changed in shape by using an extruder or nozzle in feeding the silkworms. Owing to the high price of agar-agar, the cost of ingredients involved is more or less expensive.

SUMMARY OF THE INVENTION

Silkworm raising on the conventional artificial feed also requires considerable man-power and facilities so that silkworm raising on such artificial feed is variously hindered.

Consequently, this invention has for its primary object the production of dry type artificial silkworm feed, which may be fed to the silkworms merely by adding the required amount of moisture for their better growth at the time of feeding.

Another objective is to provide a dry type artificial silkworm feed which may be fed to silkworms by merely adding various available components for the growth and preservation of the health of the silkworms together with the required amount of moisture at the time of feeding.

Another objective is to provide a dry and porous type artificial silkworm feed by employing the steps of heating, applying pressure and coagulating to form a foamed or porous substance so as to make it possible for this feed to contain the approximately required sorption of moisture or a solution which contains available components for the growth and preservation of the health of silkworms at the time of feeding.

The next important objective is to provide at the time of manufacture an artificial feed for silkworms without such available components for the growth and preservation of the health of silkworms, since some of them are not stable to heat and easily deteriorate while the feed is stored and to make such dry type feed able to absorb such available components in solution or suspension form at the time of feeding.

A further important objective of this invention is to make it possible to utilize very effectively and economically all available sustances for the growth and preservation of the health of silkworms in each stage of drying and coagulation of artificial feeds for silkworm and adding water to the dry type artificial feed.

It is to be emphasized, in connection with the invention disclosed herein, that not only is the final product (feed) obtained characterized as being dry and porous, but also, the initial ingredients blended, are dry as well. In other words, it is required that the ingredients employed in the initial blending step for preparing the silkworm feed composition of this invention be dry.

DETAILED DESCRIPTION OF THE INVENTION

There are many disadvantages connected with the use of conventional artificial silkworm feed, as mentioned previously. An artificial silkworm feed which may be fed as the occasion demands without losing available components and storage stability, has long been demanded among the sericulturists as a necessity in order to justify silkworm raising on artificial feed.

This invention has been developed after indefatigable study in order to meet such demand so as to avoid the aforementionend disadvantages which have existed in conventional artificial feeds for silkworms. In accordance with this invention, the produced artificial feed would normally be the dry type and could be fed to silkworms merely by adding moisture, which the silkworm must have for growth without deforming the shape of the feed and losing palatability. As a result, silkworm raising can be extremely simplified in comparison with the use of conventional artificial feeds in both management and practice of feeding.

Accordingly, it is possible to formulate and coagulate in the process to dry and coagulate so as to meet their palatability and appetite requirements, and to coagulate to the most desirable shape for simplified feeding, so it is not necessary to use special mechanisms or equipment to feed the same.

Further, since the artificial feed of this invention is a normally dry type, the preservability of this feed is excellent. No deterioration or putrefaction occurs. Therefore, not only may the use of very expensive refrigerating facilities be discarded, but moreover, handling and the shipment of the feed is considerably simplified, thereby cutting down on shipping charges.

In the case of using a cooker-extruder (a machine which applies steam pressure and heat and extrudes the mixture existing in a high pressure chamber to the normal atmosphere so as to obtain the mixture as an expanded type product) or an electronic range (microwave oven), to obtain the artificial feed in a dry and porous condition, the feed could be heated and cooked during this process. Therefore, it would not require such preparations before being fed to the silkworms.

Further, the artificial feed of the present invention is not subject to decomposition of vitamins, minerals, enzymes and antibiotics, which would be added in together with moisture just before the actual feeding to silkworms. If inactive components are used, ingredients which could not be used before would become usable. Moreover, those ingredients which have heretofore been added in excess because of the expectation of decomposition of the same during the heating process, would not be required in more than actual amounts desired in the feed. This results in cutting of the cost of ingredients and also increases the nutritive value of the feed. Besides the above advantages, this invention has made it possible to artificially modify the composition of amino acids, luster and size of reeled yarn from cocoons by the various formulation of ingredients as it is possible to utilize those ingredients regarded as advantageous for the growth and the preservation of the health of silkworms.

Illustrative and preferred embodiments of this invention are as follows:

EXAMPLE 1

The following dry ingredients were mixed and agitated:

| | |
|---|---|
| Pulverized dry mulberry leaf | 32% |
| Vitamin mixture | 2% |
| Pulverized raw soy beans | 25% |
| Salt mixture | 1% |
| Glucose | 5% |
| Wheat flour | 35% |

The mixture was then subjected to heat treatment with steam for 10 to 30 minutes in a sealed drum, and thereafter extruded from a small hole into the atmosphere so as to instantaneously expand the mixture into a porous feed. This was then subjected to drying to obtain feed having a residual moisture of less than 3 to 5 percent. This artificial feed was soaked in water (the volume of water was 2.5 times that of the dry feed) and fed to silkworms. The results were as follows:

1000 newly moulted 5th instar larvae were provided for this test, the weight of each being 710 mg. At the completion of the test, the average weight of the ripened silkworm was 3.75 g., the average weight of a whole cocoon was 1.90 g., the weight of the cocoon shell was 396 mg., and the percentage of cocoon shell was 20.8 percent. There was no abnormality in the amount of intake and excrement during the test period.

EXAMPLE 2

The following dry ingredients were mixed and agitated:

| | |
|---|---|
| Pulverized dry castor-oil plant leaf | 50% |
| Pulverized raw soy beans | 10% |
| Saccharose | 3% |
| Vitamin mixture | 2% |
| Wheat Flour | 30% |
| Wheat Gluten | 5% |

The mixture was then coagulated by adding a small quantity of water to it. Thereafter the mixture was exposed to microwave radiation of 2,450 mHz for about 2 minutes. A dry and foamed feed was thus obtained.

This artificial silkworm feed was fed to the Eri-silkworm (philosamia cynthia ricini) in the following way:

The feed was soaked in water (the volume of water was 2 times that of the feed itself) and fed to the silkworms. The result of this was as follows:

200 newly moulted 5th instar larvae was provided for the test. Their average weight was 730 mg. At the completion of the test, the average weight of the ripened silkworms was 3.90 g., and the weight of the cocoon shell was 230 mg. There was no abnormality in the amount of intake and excrement during this test period.

EXAMPLE 3

The following dry ingredients were mixed:

| | | |
|---|---|---|
| Pulverized dry castor-oil plant leaf | 5.0 | g |
| Pulverized raw soy beans | 2.8 | g |
| White potato starch | 1.0 | g |
| Saccharose | 0.5 | g |
| Agar-agar | 0.5 | g |
| Vitamin C | 0.2 | g |
| Water (containing antiseptics) | 30 | ml |

The mixture was subjected to heat with steam for 15 minutes, then cooled and coagulated to form a control feed. Next, the above ingredients, except agar-agar, vitamin C and the antiseptics were thoroughly mixed and an adequate amount of water was added to this mixture so as to coagulate it. Then this was exposed to microwave radiation of 2,450 for about 2 minutes and a foamed feed was obtained upon drying.

Water solutions were then prepared with antiseptic, antibiotics, digestive enzymes and vitamin C singly or in combinations of two or more of the above elements.

The foamed-type feed was used with an amount of the above solutions of 2 times the volume of the foamed feed. The results of this test are as follows:

20 each of silkworm of (N122 × N124) × (C115 × C124) were raised in this test and the environmental temperature was kept at 28°C. The weight as of 10th day from the start of this test of silkworm is shown in the Table No. 1.

Each test feed in division 2 to 5 in the following table was added with half portions of vitamin C in the control feed.

Table No. 1

| Test | Division of Feeds | Weight per Silkworm (mg) | Percentage of 3rd newly moulted silkworm | Percentage viability (%) |
|---|---|---|---|---|
| 1 | Control feed | 40 | 20 | 100 |
| 2 | Mixture of foamed feed and antiseptic for control feed | 45 | 50 | 100 |
| 3 | Mixture of foamed feed and antibiotics | 55 | 60 | 100 |
| 4 | Mixture of foamed feed and digestive enzyme | 45 | 50 | 100 |
| 5 | Mixture of foamed feed, digestive enzyme and antibiotic | 70 | 60 | 100 |

From the results shown in the above table, this invention has been exhibiting its superiority of this artificial feed for silkworms and the method of silkworm raising on this artificial feed.

Although the present invention has been adequately described in the foregoing specification and examples included therein, it is obviously apparent that various changes and modifications can be made, without departing from the spirit and scope thereof.

What is claimed is:

1. A method for raising silkworms, which comprises: administering to silkworms a dry, expanded, foamed or porous, coagulated artificial silkworm feed composition consisting essentially of as a major proportional amount (1) pulverized dry mulberry leaf or pulverized dry castor oil plant leaf, (2) pulverized dry raw soybean, (3) dry gluten and (4) dry wheat flour or potato starch, and as a minor proportional amount, ingredients selected from the class consisting of saccharose, glucose and vitamins and minerals of nutritive elements for the growth and health of silkworms and mixtures thereof.

2. The process of claim 1 wherein said pulverized leaf is present in at least 32 percent by weight.

3. The process of claim 1 wherein said dry raw soybean is present in at least 10 percent by weight.

4. The method of claim 1, wherein the artificial silkworm feed composition is soaked in water to form a product containing 50–85 percent by weight of water, which product can be directly fed to said silkworms.

5. The method of claim 4, wherein additional perishable ingredients are added to the feed during said soaking.

6. The method of claim 5, wherein said additional perishable ingredients are selected from the group consisting of antibiotics, enzymes, vitamins, antiseptics, lipids or mixtures thereof.

7. A method for raising silkworms, which comprises dry blending a composition consisting essentially of as a major proportional amount (1) pulverized dry mulberry leaf or pulverized dry castor oil plant leaf, (2) pulverized dry raw soybean, (3) dry gluten and (4) dry wheat flour or potato starch, and as a minor porportional amount ingredients selected from the class consisting of saccharose, glucose and vitamins and minerals of nutritive elements for the growth and health of silkworms and mixtures thereof; adding a very small amount of water to said blend and kneading the ingredients with said water; steaming the blended mixture for 10 to 30 minutes; extruding the steamed mixture at an elevated temperature and pressure and instantaneously coagulating the extruding mixture to form an expanded, foamed or porous, coagulated product; drying the expanded, foamed or porous, coagulated product so as to leave therein three to five percent water content and administering said dry, expanded, foamed or porous coagulated product as an artificial silkworm feed composition to silkworms.

8. The process of claim 7 wherein said pulverized leaf is present in at least 32 percent by weight.

9. The process of claim 7 wherein said dry raw soybean is present in at least 10 percent by weight.

10. The method of claim 7 wherein said artificial silkworm feed composition is soaked in water to form a product containing 50–85 percent by weight of water, which product is directly fed to the silkworms.

11. The method of claim 10 wherein additional perishable ingredients are added to the feed during said soaking.

12. The method of claim 11 wherein said additional perishable ingredients are selected from the group consisting of antibiotics, enzymes, vitamins, antiseptics, lipids and mixtures thereof.

13. A process for raising silkworms which comprises dry blending a composition consisting essentially of as a major proportional amount (1) pulverized dry mulberry leaf or pulverized dry castor oil plant leaf, (2) pulverized dry raw soybean, (3) dry gluten and (4) dry wheat flour or potato starch, and as a minor porportional amount ingredients selected from the class consisting of saccharose, glucose and vitamins and minerals of nutritive elements for the growth and health of silkworms and mixtures thereof; adding a very small amount of water to said blend and kneading the ingredients with said water; subjecting said blended mixture to microwave cooking for about 2 minutes to form an expanded, foamed porous, porous coagulated product, drying the expanded, foamed or porous, coagulated product so as to leave therein three to five percent water content and feeding said dry, expanded, foamed or porous, coagulated composition as an artificial silkworm feed composition to silkworms.

14. The process of claim 13 wherein said pulverized leaf is present in at least 32 percent by weight.

15. The process of claim 13 wherein said dry raw soybean is present in at least 10 percent by weight.

16. The method of claim 13 wherein said artificial silkworm feed composition is soaked in water to form a product containing 50–85 percent by weight of water, which product can be directly fed to said silkworms.

17. The method of claim 16 wherein additional perishable ingredients are added to the feed during said soaking.

18. The method of claim 17 wherein said additional perishable ingredients are selected from the group consisting of antibiotics, enzymes, vitamins, antiseptics, lipids or mixtures thereof.

* * * * *